(12) United States Patent
Otsuki et al.

(10) Patent No.: US 9,197,067 B2
(45) Date of Patent: Nov. 24, 2015

(54) ELECTRIC POWER SUPPLY-AND-DEMAND CONTROL SYSTEM, ELECTRIC POWER MANAGEMENT APPARATUS, AND ELECTRIC POWER SUPPLY-AND-DEMAND CONTROL METHOD

(75) Inventors: Tomoshi Otsuki, Kanagawa-ken (JP); Yoshiyuki Sakamaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 13/488,776

(22) Filed: Jun. 5, 2012

(65) Prior Publication Data
US 2012/0326505 A1 Dec. 27, 2012

(30) Foreign Application Priority Data

Jun. 27, 2011 (JP) ................. 2011-142211

(51) Int. Cl.
*H02J 3/28* (2006.01)
*H02J 4/00* (2006.01)

(52) U.S. Cl.
CPC .... *H02J 3/28* (2013.01); *H02J 4/00* (2013.01); *Y10T 307/406* (2013.01)

(58) Field of Classification Search
CPC ........... H02J 4/00; H02J 3/28; Y10T 307/406
USPC .......................................................... 307/31
See application file for complete search history.

(56) References Cited

U.S. PATENT DOCUMENTS

2012/0065792 A1 3/2012 Yonezawa et al.

FOREIGN PATENT DOCUMENTS

| JP | 2002-176729 | 6/2002 |
|----|-------------|--------|
| JP | 2008-295193 | 12/2008 |
| JP | 2010-211419 | 9/2010 |

OTHER PUBLICATIONS

Office Action of Notice of Reasons for Refusal for Japanese Patent Application No. 2011-142211 Dated Oct. 17, 2014, 5 pages.

*Primary Examiner* — Hal Kaplan
(74) *Attorney, Agent, or Firm* — Amin, Turocy & Watson, LLP

(57) ABSTRACT

An electric power supply-and-demand control system includes a memory unit, an estimation unit, a first calculation unit, and a second calculation unit. The system is capable of transmitting/receiving data to/from a power management apparatus provided to each of consumers to instruct a power management apparatus to adjust electric power. The memory unit memorizes a supply, consumptions, reserve power, and response results. The estimation unit estimates a response speed on the basis of the response results. The first calculation unit calculates a target value which allows it to eliminate an unbalance between the supply and a demand. The demand is given as a total of the consumptions. The second calculation unit calculates second adjustment amounts so that a total of the second adjustment amounts approaches the target value and is in the range.

10 Claims, 18 Drawing Sheets

| TIME | DEMAND RESULTS (kW) |
|---|---|
| 8:00 | 307 |
| 8:10 | 303.97 |
| 8:20 | 267.83 |
| 8:30 | 296.75 |
| 8:40 | 292.78 |
| 8:50 | 274.27 |
| 9:00 | 279.56 |
| 9:10 | 266.58 |
| 9:20 | 267.36 |
| 9:30 | 281.26 |
| 9:40 | 297.82 |
| 9:50 | 274.3 |
| 10:00 | 275.6 |
| 10:10 | 294.28 |
| 10:20 | 299.87 |
| 10:30 | 275.73 |
| 10:40 | 283.17 |
| 10:50 | 300.23 |
| 11:00 | 275.18 |

FIG. 3

| 【CONSUMER ID】 | CONSUMER 1 | |
|---|---|---|
| 【DEVICE ID】 | DEVICE(1,1) | DEVICE(1,2) |
| 【TYPE OF DEVICE】 | AIR CONDITIONER | LIGHT |
| 【INFORMATION OF RESERVE POWER】 | | |
| -CLASSIFICATION OF DR/REVERSE DR- | DR/REVERSE DR | DR |
| -STANDARD VALUE (kW)- | 220 | 90 |
| -MOMENTARY MAXIMUM/MINIMUM POWER (kW)- | 60/-60 | 20 |
| -CAREER MAXIMUM/MINIMUM POWER (kWh)- | 480/-480 | 160 |
| -AVAILABLE STARTING TIME- | 9:00 | 9:00 |
| -AVAILABLE ENDING TIME- | 17:00 | 17:00 |
| 【RESULTS (kW)】 | | |
| 10:00 | 200 | 100 |
| 10:10 | 200 | 100 |
| 10:20 | 200 | 100 |
| 10:30 | 200 | 100 |
| 10:40 | 200 | 100 |
| 10:50 | 200 | 100 |
| 11:00 | 200 | 100 |

FIG. 4

| [CONSUMER ID] | CONSUMER 1 | | CONSUMER 2 | CONSUMER 3 | ... | CONSUMER 4 | |
|---|---|---|---|---|---|---|---|
| [DEVICE ID] | DEVICE (1, 1) | DEVICE (1, 2) | DEVICE (2, 1) | DEVICE (3, 1) | ... | DEVICE (4, 1) | |
| [TYPE OF DEVICE] | AIR CONDITIONER | LIGHT | POWER GENERATOR | COMPUTER | | LIGHT FOR LIGHTING-UP | |
| [INFORMATION OF RESERVE POWER] | | | | | | | |
| -CLASSIFICATION OF DR/REVERSE DR- | DR/REVERSE DR | DR | DR | DR | | REVERSE DR | |
| -STANDARD VALUE (kW)- | 220 | 90 | 0 | 60 | | 0 | |
| -MOMENTARY MAXIMUM/MINIMUM POWER (kW)- | 60/-60 | 20/0 | 100/0 | 30/0 | | 0/-100 | |
| -CAREER MAXIMUM/MINIMUM POWER (kWh)- | 480/-480 | 160/0 | - | 240/0 | | 0/-500 | |
| -AVAILABLE STARTING TIME- | 9:00 | 9:00 | - | 9:00 | | 17:00 | |
| -AVAILABLE ENDING TIME- | 17:00 | 17:00 | - | 17:00 | | 22:00 | |
| -RESPONSE CHARACTERISTICS- | | | | | | | |
| --RESPONSE SPEED (kW/min)- | 2/2 | 1 | 10 | 10 | | 10 | |
| --RESPONSE TIME (min)- | 30/30 | 15 | 10 | 3 | | 10 | |
| -DR MAXIMUM (kW)- | 40 | 30 | 20 | 20 | | 0 | |
| -DR MINIMUM (kW)- | -80 | 0 | 0 | 0 | | 0 | |
| [RESULTS (kW)] | | | | | | | |
| 10:00 | 200 | 100 | 50 | 50 | | 0 | |
| 10:10 | 200 | 100 | 50 | 50 | | 0 | |
| 10:20 | 200 | 100 | 50 | 50 | | 0 | |
| 10:30 | 200 | 100 | 70 | 50 | | 0 | |
| 10:40 | 200 | 100 | 70 | 50 | | 0 | |
| 10:50 | 200 | 100 | 70 | 50 | | 0 | |
| 11:00 | 200 | 100 | 80 | 50 | | 0 | |

FIG. 6

| CONSUMER ID | CONSUMER 1 | | | | ... |
|---|---|---|---|---|---|
| DEVICE ID | DEVICE(1,1) | | DEVICE(1,2) | | ... |
| TYPE OF DEVICE | AIR CONDITIONER | | LIGHT | | ... |
| DATE | DR AMOUNT (kW) | RESPONSE TIME (min) | DR AMOUNT (kW) | RESPONSE TIME (min) | |
| APRIL 1 | 60 | 30 | 0 | | |
| APRIL 2 | 60 | 25 | 10 | 10 | |
| APRIL 3 | -60 | 35 | 20 | 20 | |
| APRIL 4 | 0 | | 15 | NOT EXECUTED | |
| APRIL 5 | 0 | | 0 | | |
| APRIL 6 | 0 | | 0 | | |
FIG. 7
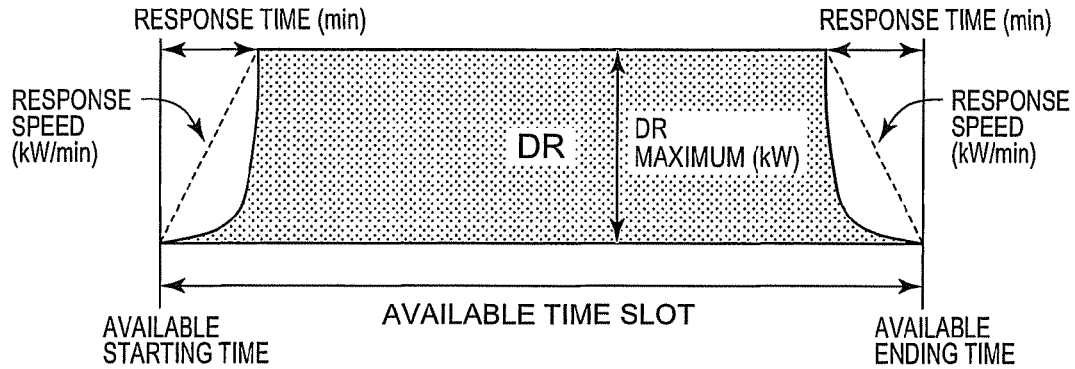
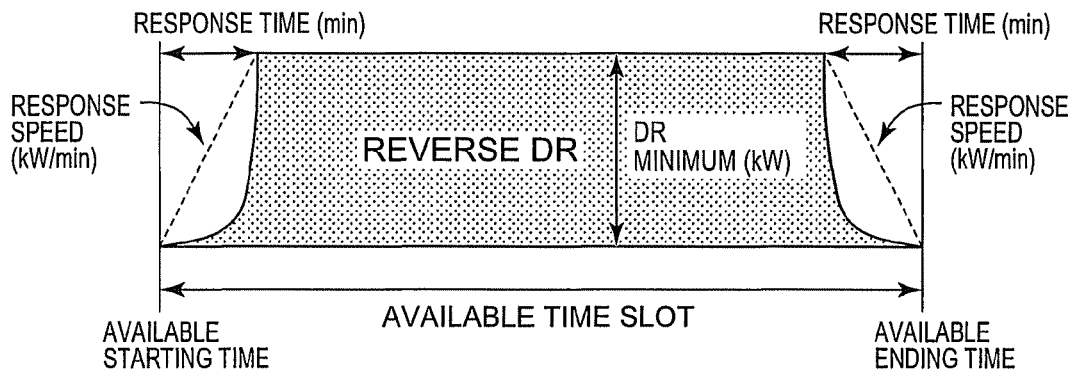
FIG. 8

| TIME | DEMAND RESULTS (kW) | | | | POWER-SUPPLY PROGRAM (kW) | SUPPLY-AND-DEMAND UNBALANCE (kW) |
|---|---|---|---|---|---|---|
| | CONSUMER 1 | CONSUMER 2 | CONSUMER 3 | CONSUMER 4 | | |
| 8:00 | 307 | 37.691 | 248.42 | 272.772 | 860 | 5.883 |
| 8:10 | 303.97 | 46.008 | 332.58 | 250.958 | 860 | 73.516 |
| 8:20 | 267.83 | 30.165 | 333.83 | 229.143 | 860 | 0.968 |
| 8:30 | 296.75 | 37.478 | 323.77 | 207.327 | 860 | 5.325 |
| 8:40 | 292.78 | 44.033 | 318.84 | 185.51 | 860 | -18.837 |
| 8:50 | 274.27 | 50.862 | 321.58 | 163.69 | 860 | -49.598 |
| 9:00 | 279.56 | 36.887 | 254.89 | 141.88 | 680 | 33.217 |
| 9:10 | 266.58 | 40.46 | 257.44 | 120.06 | 680 | 4.54 |
| 9:20 | 267.36 | 40.367 | 244.11 | 98.25 | 680 | -29.913 |
| 9:30 | 281.26 | 28.907 | 332.47 | 76.44 | 680 | 39.077 |
| 9:40 | 297.82 | 22.683 | 240.6 | 54.63 | 680 | -64.267 |
| 9:50 | 274.3 | 36.523 | 316.16 | 32.82 | 680 | -20.197 |
| 10:00 | 275.6 | 56.253 | 233.76 | 111.51 | 600 | 77.123 |
| 10:10 | 294.28 | 33.591 | 185.76 | 89.21 | 600 | 2.841 |
| 10:20 | 299.87 | 23.676 | 209.08 | 67.41 | 600 | 0.036 |
| 10:30 | 275.73 | 42.209 | 146.58 | 45.62 | 600 | -89.861 |
| 10:40 | 283.17 | 19.612 | 231.72 | 23.83 | 600 | -41.668 |
| 10:50 | 300.23 | 49.066 | 231.72 | 22.05 | 600 | 3.066 |
| 11:00 | 275.18 | 34.937 | 231.72 | 80.27 | 500 | 122.107 |

FIG. 9

| CONSUMER ID | CONSUMER 1 | | CONSUMER 2 | CONSUMER 3 | ... | CONSUMER 4 | ... |
|---|---|---|---|---|---|---|---|
| DEVICE ID | DEVICE (1, 1) | DEVICE (1, 2) | DEVICE (2, 1) | DEVICE (3, 1) | ... | DEVICE (4, 1) | ... |
| TYPE OF DEVICE | AIR CONDITIONER | LIGHT | POWER GENERATOR | COMPUTER | | LIGHT FOR LIGHTING-UP | |
| | DR PROGRAM (kW) | | | | | | |
| 11:10 | -60 | 0 | 0 | 0 | | 0 | |
| 11:20 | -60 | 0 | 0 | 0 | | 0 | |
| 11:30 | -60 | 0 | 0 | 0 | | 0 | |
| 11:40 | 0 | 10 | 0 | 30 | | 0 | |
| 11:50 | 0 | 10 | 0 | 30 | | 0 | |
| 12:00 | 0 | 10 | 0 | 30 | | 0 | |
| 12:10 | 0 | 0 | 10 | 0 | | 0 | |
| 12:20 | 0 | 0 | 10 | 0 | | 0 | |
| 12:30 | 0 | 0 | 10 | 0 | | 0 | |

FIG. 10

| | CONSUMER 1 | | CONSUMER 2 | |
|---|---|---|---|---|
| TIME | 11:00~12:00 | 12:00~13:00 | 11:00~12:00 | 12:00~13:00 |
| URGENCY(w(t)) | 1 | 3 | 1 | 3 |
| RESULTS(kWh) | 250 | 200 | 500 | 600 |
| TARGET VALUE (kWh) | 200 | 150 | 400 | 300 |
| DEGREE OF RESPONDING TO DR | 0.02 | 0.02 | 0.01 | 0.0033 |
| E(k) | 0.08 | | 0.02 | |

ELECTRIC POWER SUPPLY-AND-DEMAND CONTROL SYSTEM, ELECTRIC POWER MANAGEMENT APPARATUS, AND ELECTRIC POWER SUPPLY-AND-DEMAND CONTROL METHOD

CROSS REFERENCE TO RELATED APPLICATION

This application is based upon and claims the benefit of priority from the prior Japanese Patent Application No. 2011-142211, filed on Jun. 27, 2011, the entire contents of which are incorporated herein by reference.

FIELD

Embodiments relate basically to an electric power supply-and-demand control system, an electric-power management apparatus, and an electric-power supply-and-demand control method.

BACKGROUND

There is proposed a technique to control electric power supply-demand balance as a whole power system. In the technique, a power supplier generating or supplying power requires power consumers to reduce power consumption when the power supplier operates various power systems.

However, a time-lag takes place between the requirements of power reduction by the power supplier and actual power reductions by the power consumers. The time-lag causes a problem that a robust control of power supply-and-demand balance cannot be performed particularly when an amount of power supply and demand varies with time.

BRIEF DESCRIPTION OF THE DRAWINGS

Aspects of this disclosure will become apparent upon reading the following detailed description and upon reference to accompanying drawings.

FIG. 3 is a view showing sequential data of demand results.

FIG. 4 is a view showing an example of device information.

FIG. 6 is a view showing an example of database including device information.

FIG. 7 shows an example of response results of the devices to a DR (Demand Response) signal.

FIG. 8 is a view showing examples of reserve power for DR and reverse DR.

FIG. 9 is a view showing an example showing power supply-and-demand unbalances.

FIG. 10 is a view showing an example of a DR program for each of the devices.

DESCRIPTION

As will be described below, in accordance with an embodiment, an electric power supply-and-demand control system includes a memory unit, an estimation unit, a first calculation unit, and a second calculation unit. The system is capable of transmitting/receiving data to/from a power management apparatus provided to each of consumers to instruct the apparatus to adjust electric power. The memory unit memorizes a supply, consumptions, reserve power, and response results. The supply shows a total of electric power supplied to the consumers. The consumptions show electric-power consumptions of the consumers. The reserve power shows a range of electric power adjustable for each of the consumers. The response results show a time needed for the consumers to have reached a first adjustment amount previously. The estimation unit estimates a response speed on the basis of the response results. The first calculation unit calculates a target value which allows it to eliminate an unbalance between the supply and a demand. The demand is given as a total of the consumptions. The second calculation unit calculates second adjustment amounts so that a total of the second adjustment amounts approaches the target value and is in the range.

In accordance with another embodiment, a power management apparatus includes devices, a memory unit, a detector, and a transmitter. The apparatus is capable of transmitting/receiving data to to/from the electric power supply-and-demand control system. The devices are provided to each of consumers. The memory unit memorizes reserve power for operation of each of the devices. The detector detects power consumptions by the consumers. The transmitter transmits the power consumptions and the reserve power to the electric power supply-and-demand control system.

In accordance with another embodiment, an electric power supply-and-demand control method for the above electric power supply-and-demand control system includes the following 3 steps. The first step estimates response characteristics including a response speed on the basis of the response results by the use of the estimation unit. The response speed is a speed of until a maximum of reserve power is reached. The second step calculates a target value by the use of the first calculation unit. The target value allows it to eliminate an unbalance between the power supply and a power demand. The power demand is given as a total of power consumptions. The third step calculates the second adjustment amounts by the use of the second calculation unit so that a total of the second adjustment amounts approaches the target value and is in the range.

Embodiments will be described below with reference to the drawings.

First Embodiment

Figure 1:
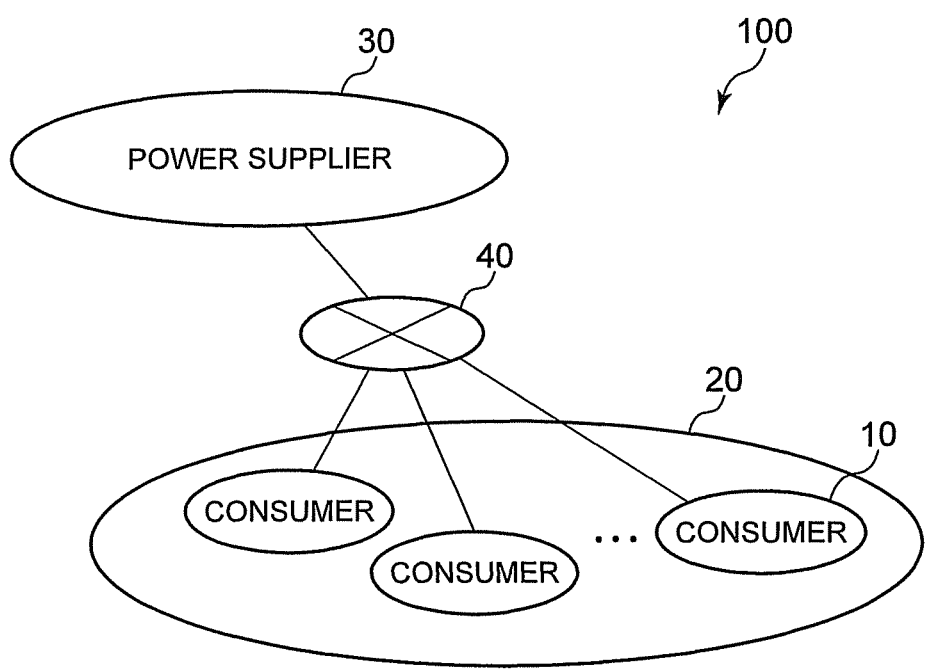
FIG. 1 is a schematic view showing a power control system in accordance with a first embodiment.

FIG. 1 is a schematic view showing a power control system 100 in accordance with a first embodiment. In the first embodiment, a group 20 and an electric power supplier 30 are connected to each other via a network 40. Two or more power consumers 10 belong to the group 20. The power supplier 30 supplies electric power to each of the consumers 10 belonging to the group 20. Examples of the network include an internet network and a power network. Hereinafter, "electric power" will be referred to simply as "power" throughout the specification.

The consumers are assumed to include a standard home and an office building. The group 20 may include an assembly of standard homes or office buildings and the mixed thereof. In addition, the power supplier 30 may be a trader who trades both power generation and supply or power supply only on a regular basis. Moreover, the power supplier 30 may be a power aggregator who aggregates power and supplies power to the consumer or power market who manages the electric grid.

The power control system in accordance with the first embodiment will be described below with reference to FIGS. 2 to 13. Here, the description is provided using the group 20 including 4 consumers as an example.

Figure 2:
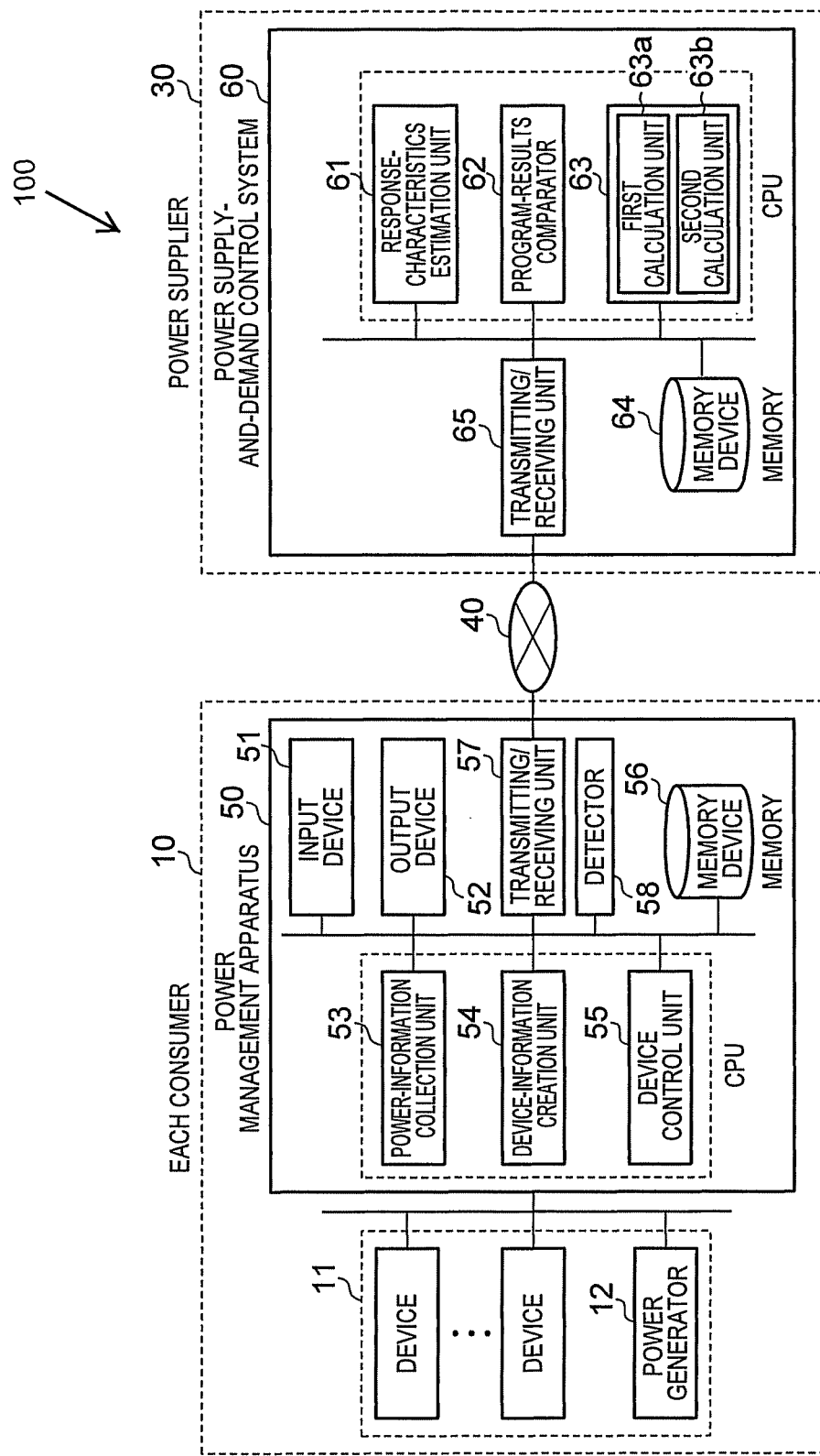
FIG. 2 is a view showing a configuration of the power control system in accordance with the first embodiment.

FIG. 2 is a view showing a configuration of the power control system 100 in accordance with the first embodiment.

Each of the consumers 10 is provided with electric devices 11 including an air conditioner, a light, and a computer. The electric devices are hereinafter referred to simply as "devices."

The devices 11 may include a power generator 12 such as a photovoltaic power system, etc. for all or some of the consumers 10 to independently generate power.

Each consumer 10 is provided with a power management apparatus 50 to manage electric power. The devices 11 provided to the respective consumers 10 are connected through wires or wirelessly to the power management apparatus 50 which manages information of power consumptions of the devices 11. The power management apparatus 50 can control operation of the devices 11 instead of an operator if needed.

A power supplier 30 has a power supply-and-demand control system 60 to control power demand-and-supply balance of the whole power control system 100. The power supply-and-demand control system 60 creates a DR program to control the power demand-and-supply balance as a whole on the basis of the information sent from each consumer 10 via a network 40. The RD program includes an adjustment amount, e.g., a reduction or an increment of power consumption which the supplier 30 requires of each consumer 10. Hereinafter, the "adjustment amount" is referred to as the "DR amount."

The electric power supply-and-demand control system 60 transmits a demand response signal (DR signal) to the power management apparatus 50 of each consumer 10 on the basis of this DR program. The DR signal preferably specifies the DR amount. Alternatively, the DR signal may include an amount of power generation to be allocated to the power generator 12 as a DR amount.

Here, the power supplier 30 is assumed to have the power supply-and-demand control system 60. Alternatively, the power supply-and-demand control system 60 may be provided to a trader who mediates the power supplier 30 and the consumers 10.

Configuration and Operation of Power Management Apparatus

A power management apparatus 50 is provided with a power-information collection unit 53, a device-information creation unit 54, a device control unit 55, and a memory unit 56. The power management apparatus 50 is provided also with an input device 51 such as a keyboard and an output device 52 such as a display.

The power-information collection unit 53 detects periodically (e.g., every 10 min) total power consumption (demand results) of all the devices 11 provided to the respective consumers 10 using a detector 58 such as a power meter. The demand results detected are stored sequentially in a memory unit 56 as time-series data as shown in FIG. 3.

Alternatively, the power-information collection unit 53 may be configured to compensate or estimate the demand results on the basis of history of demand results unless the unit 53 can detect the actual demand. Alternatively, the power-information collection unit 53 may be configured to estimate the demand results up to the present when the power-information collection unit 53 detects with a long period and cannot acquire the latest demand results.

The device-information generating device 54 generates all pieces of device information about all the devices 11 provided to the respective consumers 10 to store all the pieces in the memory 56. As shown in FIG. 4, the pieces of the device information include a device ID, e.g., a device (i, k) (the k-th device provided to the i-th consumer), a type of the device, information about reserve power, and the demand results.

The information about reserve power is defined as information about capacity of the devices 11. The capacity is available for meeting the requirements of the power reduction/the power generation or increase from the power supplier 30. The pieces of information about reserve power include the following terms, i.e., "classification of DR/reverse DR", "standard value", "momentary maximum/minimum power", "total maximum/minimum power of the devices 11", "available starting time", and "available ending time."

Figure 5:
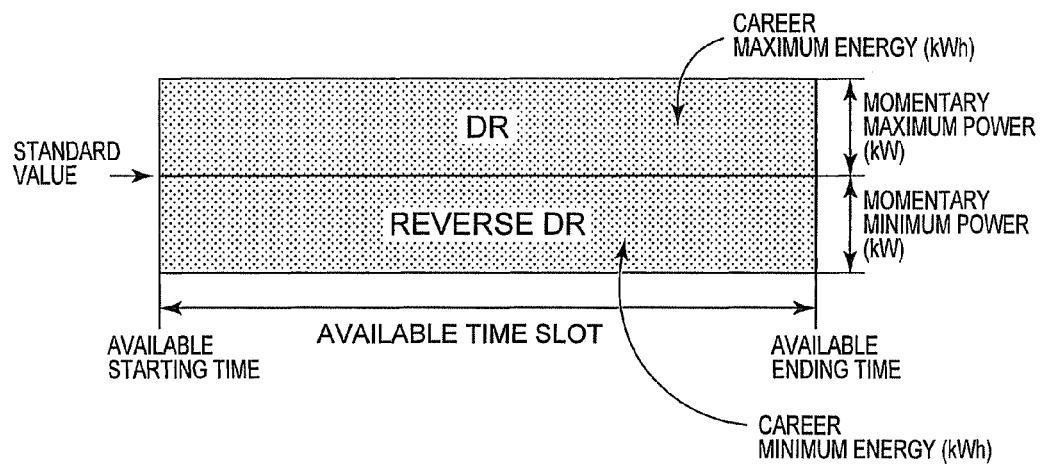
FIG. 5 is a view to describe an example of the reserve power of devices for which a consumer files.

FIG. 5 is a view to describe an example of the reserve power of the devices 11 for which the consumer 10 files.

The consumer 10 has reserve power for each device 11 provided thereto. This reserve power shows a degree of the capability for each consumer 10 to be able to meet the requirements of a reduction in power consumption (power saving)/power generation or an increase in power consumption from standard power with each device 11. Hereinafter, the standard power is referred to as the "standard value."

The classification of "DR" shows that the device 11 is available for reducing power consumption from the standard value. That is, the device 11 is capable of generating power like a power-generating unit 12 which is available for meeting the requirement of power generation as a whole in the power control system 100.

The classification of "DR/reverse DR" shows that the device 11 is capable of both reducing and increasing power consumption from the standard value. That is, the device 11 is available for meeting both requirements of power generation and consumption.

The classification of "reverse DR" shows that the device 11 is not used normally or needed to be used normally at constant power consumption. That is, the device 11 is capable of increasing power consumption from the standard value.

The "standard value" shows the value of power to be the basis of classifications of DR and reverse DR. Examples of the standard value include basic power which is necessary for each consumer 10 to use the devices 11 and an averaged value of the past power consumption in a state free from limitations due to the DR signals.

The "momentary maximum/the minimum electric power" expresses the maximum and the minimum of power which can be adjusted from a standard value. That is, the momentary maximum/minimum power may be a difference between the standard value and a physical limit or a difference between the standard value and a restriction limit. The physical limit is a limit up to which the device 11 can increase or decrease its power consumption. The restriction limit is to restrict operation of the device 11 in a range which an operator can allow.

The "total maximum/minimum electric energy" expresses the maximum and the minimum of electric energy which are given by the time integration of the DR amount. The "total maximum/the minimum electric energy" may be determined by time limitations, such as an available starting time and an available ending time, or by physical performances of the devices 11.

The "available starting time" and the "available ending time" express a time slot in which the devices 11 are available for the DR or the reverse DR. In addition, the operator can set another time slot available for requirements of the DR or reverse DR from the power supplier 30 within the time slot of the devices 11. In such a case, the operator multiplies the values of the momentary maximum/minimum power by the total time to be assigned as the total maximum/minimum energy.

Here, constant values are employed for the standard value and the momentary maximum/minimum power. Alternatively, time-varying values may be employed therefor. Alternatively, the power supplier 30 may specify the standard value and the momentary maximum/minimum power for each device 11 provided to the consumer 10, provided that there are a large gap and a need for urgent. The large gap is a difference between the power supply and the power demand.

The operator can register manually the above-mentioned "available starting time" and "available ending time" using an input device 51 provided to the power management apparatus 50 instead of the device-information creation unit 54, for example. At that time, the operator can place "- (hyphen)" on terms unnecessary to be specified.

The "standard value" and the "momentary maximum/minimum power" can be produced by the following two procedures. An operator firstly registers driving conditions, e.g., temperatures for air conditioners. The device-information creation unit 54 secondly refers to the driving conditions previously stored in the memory unit 56 and the correspondence table of power consumption under the driving conditions to create device information such as the standard value, etc.

The "results" denote the power that each device 11 actually consumed or is currently consuming. When the device 11 is the power generator 12, the results denote the power that the device 11 actually generated or is currently generating. The device-information creation unit 54 detects results of each device 11 periodically (every 10 min) to provide the results of the device 11 at each time.

Alternatively, the device-information creation unit 54 may be configured to estimate results on the basis of supplement processing or history of past results unless the device-information creation unit 54 can detect the results. Alternatively, the device-information creation unit 54 may be configured to estimate the results up to the present when the device-information creation unit 54 detects with a long period and cannot acquire the latest results.

A transceiver 57 transmits actual demands and device information to the power supply-and-demand control system 60 in real time via the network 40. The actual demands and device information are provided to the memory unit 56. The power supply-and-demand control system 60 is provided to the power supplier 30.

The transceiver 57 receives a DR signal to temporarily store the DR amount specified by the DR signal in the memory unit 56. The DR signal is transmitted by the power supply-and-demand control system 60 to be described later in detail.

The device control unit 55 refers to the DR amount stored in the memory unit 56 to switch ON/OFF of the devices 11 or change the settings of the devices 11 so that the DR amount is achieved, thereby controlling the devices 11. This allows the device control unit 55 to adjust the results of the devices 11.

Alternatively, an operator may check the DR signal with the output unit 52 to indirectly control the devices 11. In that case, the time at which the operator operated the devices 11 can be set as the starting time to start adjusting.

Configuration and Operation of Power Supply-And-Demand Control Device

The power supply-and-demand control system 60 is provided with a response-characteristics estimation unit (estimation unit) 61, a program-results comparator (comparator) 62, a demand-and-supply optimizer 63, and a memory unit 64. The demand optimizer 63 includes a first calculation unit 63a and a second calculation unit 63b. The memory unit 64 memorizes information from the power management apparatus 50 which is provided to the consumer 10.

The response-characteristics estimation unit 61 provides "response characteristics," a "DR maximum," and a "DR minimum" to the device information of the memory unit 64 to create a database of device information shown in FIG. 6 and update the database.

The "response characteristics" include a "response speed" and "response time" as a parameter. The response speed and the response time express a speed and a necessary time in a transient period, respectively. The transient period is a term from when the device control unit 55 receives a DR signal to start controlling the devices 11 until the DR amount specified by the DR signal is reached. The device control unit 55 is included in the power management apparatus 50 provided to the consumer 10.

The response-characteristics estimation unit 61 compares time-series data of results with a DR program described later to create response results of each device 11. The time-series data of the results is included in the device information that the memory unit 64 memorizes. The DR program is memorized also by the memory unit 64. The response speed and the response time are periodically estimated using the response results to update the response characteristics included in the database of device information.

FIG. 7 shows an example of response results of the devices 11 to the DR signal.

The response results include a time-series data relating a "DR amount" to a "response time." The "DR amount" is required by a first DR signal among DR signals of a day. The "response time" shows a term from a time to start the actual controlling of the devices 11 until the DR amount is reached. Here, a positive DR amount denotes requirements of a power reduction/generation (DR) and a negative DR amount denotes a requirement of a power increase (reverse DR).

The example in FIG. 7 shows that the device (1, 1) of the consumer 1 was given DR signals of 60 kW on April 1, 2, and a signal of −60 kW on April 3 to respond after 30 min, 25 min, and 35 min, respectively. In that case, the response-characteristics estimation unit 61 calculates an average response speed of the respective days as being (60+60+60)/(30+25+35)=2.0 (kW/min).

On the other hand, the example shows the following. The device (1, 2) of the consumer 1 was given DR signals of 10 (kW), 20 (kW), and 15 (kW) on April 2, 3, and 4, respectively. The device (1, 2) responded after 5 min and 10 min on April 2 and 3, respectively. However, the device (1, 2) did not respond on April 4. In the latter case, the device (1, 2) had no response on April 4, which is excluded from calculating an average response speed. Thus, the average response speed is calculated to be (10+20)/(10+20)=1.0 (kW/min).

In addition, the response-characteristics estimation unit 61 can calculate the time to reach the momentary maximum power as a typical value of response time by dividing the momentary maximum power by the above-calculated response speed. In addition, the response time can be stored in the memory unit 64 as a function of the DR amount.

Alternatively, the response speed may employ a value obtained by striking an average of all the response times for the responses to two or more DR signals per day, although the response time to the first DR signal among DR signals during the day has been employed to calculate the response speed.

Although the response speed has employed the average value, the time-change rate of the speed, i.e., the acceleration can be employed to allow it to consider a response speed changing with time.

The "DR maximum" and the "DR minimum" show a maximum and a minimum which the supplier 30 can actually require of the devices 11 of each consumer 10. The maximum and minimum are in the range of reserve power for which each consumer 10 files.

The response-characteristics estimation unit 61 calculates a difference between a standard value and latest results. The standard value is of the device-information database that the memory unit 64 memorizes. The latest results are of the actual time-series data of the devices 11. Subtracting the difference from the momentary maximum/minimum power provides the DR maximum for DR and the DR minimum for reverse DR.

In FIG. 6, the device (1, 1) shows 200 (kW) as its latest record at 11:00 with respect to a standard value of 220 (kW). Accordingly, the difference is calculated to be 220-200=20 (kW). The positive difference means the following two cases. The consumer 1 reduces power of 20 (kW) voluntarily when the difference is regarded as DR and consumes power less than the standard value by 20 (kW) when the difference is regarded as reverse DR.

In the contrast, a negative difference means the following two cases. The consumer 10 consumes power over the standard value when the difference is regarded as DR and increases power voluntarily when the difference is regarded as reverse DR.

Accordingly, the response-characteristics estimation unit 61 calculates 60−20=40 (kW) and −60−20=−80 (kW) as the DR maximum and the DR minimum, respectively, when the device (1, 1) is employed as an example.

As mentioned above, the devices 11 dedicated to DR can calculate just the DR maximum by setting the DR minimum to zero. As mentioned above, the devices 11 dedicated to reverse DR can calculate just the DR minimum by setting the DR maximum to zero.

When a device 11 is the power-generation unit 12, the device 11 is given an amount of power generation as results and subtracts the standard value from the results to calculate a difference, thereby subtracting the difference from the momentary maximum power to calculate the DR maximum.

The response-characteristics estimation unit 61 calculates 80−0=80 (kW) and 100−80=20 (kW) as a difference and a DR maximum, respectively, when the device (2, 1) is employed as an example. At that time, the DR minimum can be set to zero.

As mentioned above, the reserve power of devices 11 available to the power supply-and-demand control system 60 reflects response characteristics, the DR maximum, and the DR minimum shown in FIG. 8.

The program-results comparator (comparator) 62 uses demand results of each consumer 10 memorized by the memory unit 64 and a power-supply program to calculate supply-and-demand unbalances between power supply and power demand shown in FIG. 9. And this supply-and-demand unbalance is stored in the memory unit 64.

The supply program is a program of the power amount to be supplied from the power supplier 30 to the group 20. The supply program is assumed to file a constant amount every 10 minutes. Alternatively, the supply program may file a whole day program beforehand or be sequentially updated in real time.

The supply-and-demand unbalance is represented by a value obtained by subtracting the supply program (amount of power supply) from power (amount of power demand) which is given as a sum of demand results and necessary for the whole group 20. Being positive, the value shows excessive demand. Being negative, the value shows excessive supply.

The program-results comparator (comparator) 62 calculates supply-and-demand unbalance as being (307+37.691+248.42+272.772)−860=5.883 (kW) at 8:00 specifically in FIG. 9.

The demand-and-supply optimizer 63 uses device information and supply-and-demand unbalance to create a DR program, i.e., a list of DR amounts. Both the device information and the supply-and-demand unbalance have been updated by the response-characteristics estimation unit 63. The DR amounts are required of the devices 11 provided to a consumer 10 at each time. And the demand-and-supply optimizer 63 updates the DR program periodically to store the updated DR program in the memory unit 64.

FIG. 10 shows an example of a DR program programmed for each device 11 provided to each consumer 10. The DR program includes DR amounts to be required of the devices 11 at each time. The devices 11 are provided to the respective consumers 10.

In FIG. 10, the DR program is updated every 10 minutes. FIG. 10 show that the DR program assigns a reverse DR of 60 (kW) to the device (1, 1) constantly from 11:00 to 11:39, a DR of 10 (kW) to the device (1, 2) constantly from 11:40 to 12:09, a DR of 30 (kW) to the device (3, 1) at any time, and a DR of 10 (kW) to the device (2, 1) constantly from 12:10 to 12:39. It is also shown that the DR program assigns neither DR nor reverse DR to the device (4, 1) from 11:10 to 12:39.

Figure 11:
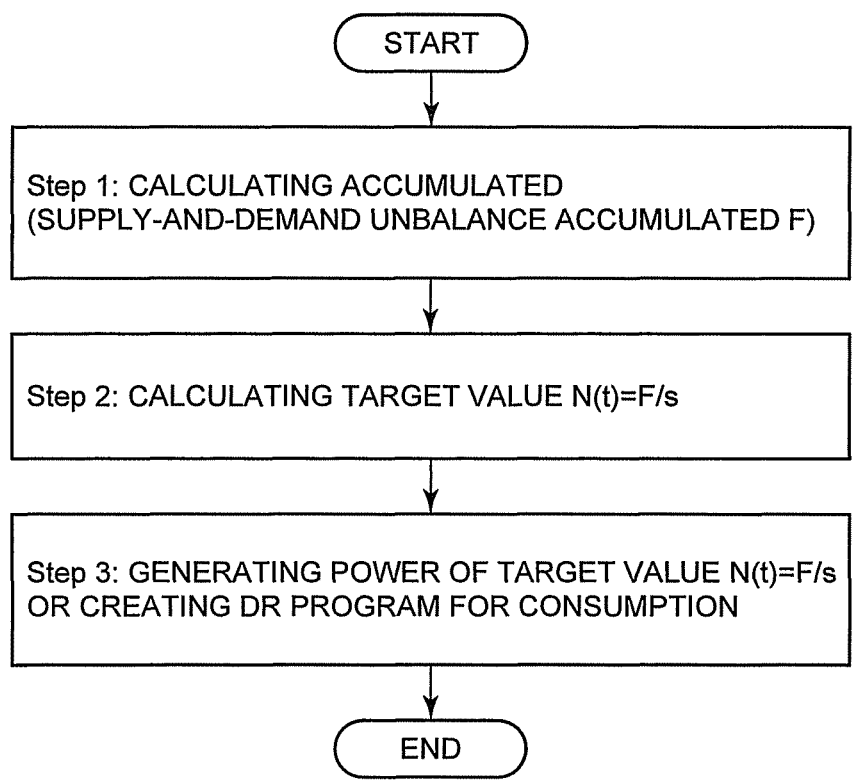
FIG. 11 is a view showing a flow chart describing operation of a supply-and-demand optimizer.

FIG. 11 shows a flow chart describing operation of the supply-and-demand optimizer 63. In the following description, the supply-and-demand optimizer 63 shall perform processing each minute.

Firstly, the first calculation unit 63a calculates a target value of power to be generated or consumed from the first step to the second step.

At Step 1, the first calculation unit 63a uses supply-and-demand unbalance F(t) at each time to calculate the accumulated (supply-and-demand unbalance accumulated F). Here, $t_n$ is assumed to be the present time. In addition, "s" is a term to be the basis of the calculation of the supply-and-demand unbalance accumulated F and is beforehand determined.

$$F \leftarrow \sum_{t=t_n-s}^{t_n-1} F(t) \qquad \text{[Formula 1]}$$

At Step 2, the supply-and-demand unbalance accumulated F is averaged as being the following equation. As a result, power is calculated as a target value N(t), which is estimated to be short or excessive at a time of $t_n$, provided that the past tendency at the time of $t_{n\cdot s}$ to $t_{n\cdot 1}$ will continue also in the future.

$N(t) \leftarrow F/s$ [Formula 2]

The target value is not limited to the above-mentioned. Alternatively, the target value may be calculated on the basis of a model to predict power supply and demand amounts, e.g., from past climate conditions.

Next, the second calculation unit 63b calculates a DR amount to be assigned by following Step 3 to the devices 11 provided to the consumer 10.

At Step 3, the DR program is created to hold the total DR amount close to the target value so that power is generated or consumed each minute.

Specifically, the above-described can be treated as the following optimization problem to put a total DR amount close to a target value at each time and to equally assign a total DR amount to each consumer 10. In the optimum problem, the total DR amount close to the target value and the DR assignment are provided in the range of the maximum and minimum of reserve power for which the devices 11 of each consumer 10 are available at the time t.

[Formula 3]

$$\min. \Sigma_t W(t) \cdot V(t) + \Sigma_i |Y_{ave} - Y_i|_D \quad (1)$$

$$s.t. \ V(t) = N(t) - \Sigma_i \Sigma_k x_{i,k}(t) \ (t=1,2,\ldots) \quad (2)$$

$$m_{i,k}(t) \leq x_{i,k}(t) \leq M_{i,k}(t) \ (t=1,2,\ldots, i=1,2,\ldots, k=1,2,\ldots) \quad (3)$$

$$Y_i = \Sigma_t \Sigma_k |x_{i,k}(t)| \ (i=1,2,\ldots) \quad (4)$$

$$Y_{ave} = (\Sigma_i Y_i)/D \quad (5)$$

$X_{i,k}(t)$: DR amount of device (i, k) provided to consumer i at time t
(DR amount is positive for DR and negative for reverse DR)
$M_{i,k}(t)$: maximum of reserve power of device (i, k) provided to consumer i at time t
$m_{i,k}(t)$: minimum of reserve power of device (i, k) provided to consumer i at time t
$Y_i$: total absolute value of DR amounts of consumer i
$Y_{ave}$: averaged absolute value of DR amounts for each consumer
$N(t)$: target value for total of DR amounts
$V(t)$: value gapped with target value at time t
$W(t)$: cost per unit power when gapped with target value at time t
D: total number of consumers
$|x-y|_D$ distance between x and y (e.g., Euclidean distance)

The first term of Formula (1) expresses costs due to a deviation from the target value. The second term thereof expresses costs due to DR amounts unequally assigned to the respective consumers. Both the first and second terms minimize the total cost under the limiting conditions of (2) to (5).

Equation (3) expresses a range of DR amount available for being assigned to the k-th device (i, k) provided to the i-th consumer at a time t. Equation (3) can be determined by, e.g., the DR maximum, the DR minimum, and the response speed of the device k) at a time immediately prior to the time t.

For example, when the device (i, k) available for DR has reserve power of the DR maximum M, the limiting formula of the DR amount $x_{i,k}(t)$ is derived from the DR maximum and minimum and given as $0 \leq x_{i,k}(t) \leq M$. In addition, when the response speed is expressed as v(kW/min), the limiting formula of $x_{i,k}(t)$ is determined by the DR amount and the response speed at the time immediately prior to the time t and expressed as $x_{i,k}(t-1) \cdot v \leq x_{i,k}(t) \leq x_{i,k}(t-1)+v$. Therefore, the following formula (4) corresponds to Equation (3), being given by combining the above-expressed two formulae.

$$\mathrm{MAX}(0, x_{i,k}(t-1)-v) \leq x_{i,k}(t) \leq \mathrm{MIN}(M, x_{i,k}(t-1)+v) \quad [\text{Formula 4}]$$

Here, MAX (a, b) is an operator to yield "a" and "b" whenever b≤a and a≤b hold true, respectively. In addition, MIN (a, b) is an operator to yield "a" and "b" whenever a≤b and b≤a hold true, respectively.

When the device (i, k) has reserve power with its DR minimum M is available for reverse DR, the limitation equation on $x_{i,k}(t)$ is derived from the DR maximum/minimum and expressed as $M \leq x_{i,k}(t) \leq 0$. When the response speed is v(kW/min), the limitation equation on $x_{i,k}(t)$ is derived from the response speed and the DR amount at a time immediately prior to the time t and expressed as $x_{i,k}(t-1)-v \leq x_{i,k}(t) \leq x_{i,k}(t-1)+v$. Accordingly, the following formula (5) corresponds to Equation (3), being given by combining the above-expressed two formulae.

$$\mathrm{MAX}(M, x_{i,k}(t-1)-v) \leq x_{i,k}(t) \leq \mathrm{MIN}(0, x_{i,k}(t-1)+v) \quad [\text{Formula 5}]$$

In addition, when the device (i, k) available for DR and reserve DR has reserve power with its DR maximum and minimum M1, M2, the limiting formula on the DR amount $x_{i,k}(t)$ is derived from the DR maximum and DR minimum and given as $M2 \leq x_{i,k}(t) \leq M1$. In addition, when the response speeds are expressed as v1 (kW/min) for DR and v2 (kW/min) for reverse DR, the limiting formula of $x_{i,k}(t)$ is derived from the DR amount and the response speeds at the time immediately prior to the time t and expressed as $x_{i,k}(t-1)-v2 \leq x_{i,k}(t) \leq x_{i,k}(t-1)+v1$. Therefore, the following formula (6) is given by combining the above-expressed two formulae and corresponds to Equation (3).

$$\mathrm{MAX}(M2, x_{i,k}(t-1)-v2) \leq x_{i,k}(t) \leq \mathrm{MIN}(M1, x_{i,k}(t-1)+v1) \quad [\text{Formula 6}]$$

The above formulation is just an example. Alternatively, the formulation may optimize a difference between a total DR amount and a target value on the basis of the reserve power and the target value of the device 11 so that the difference vanishes. The difference is optimized in the range between the minimum reserve power and the maximum reserve power both being determined by the response characteristics. Alternatively, more limits may be added to Formulae (2) to (5) in the above optimization problem.

In addition, an optimum solution for the above optimization problem need not be an exact one. Alternatively, the optimum solution may be the DR amount at the time when the above difference falls within a range and the optimization process is ended. The range is determined by the power supplier 30.

The supply-and-demand optimizer 63 creates a DR program on the basis of the DR amounts provided by solving the above optimization problem. In accordance with the DR program, a transmitting/receiving unit 65 transmits a DR signal for each device 11 to the power management apparatus 50 provided to a consumer 10.

Alternatively, the consumer 10 may have reserve power as a whole, although the consumer 10 has been assumed to have reserve power for each device 11 provided to the consumer 10 in this embodiment. At that time, the transmitting-receiving unit 65 optimizes the DR amount for the consumer 10 as a whole, not for each device 11, and transmits the DR signal to the power management apparatus 50.

How to solve an optimization problem given by Formula (3) will be described below.

First Example of Solution

Figure 12:
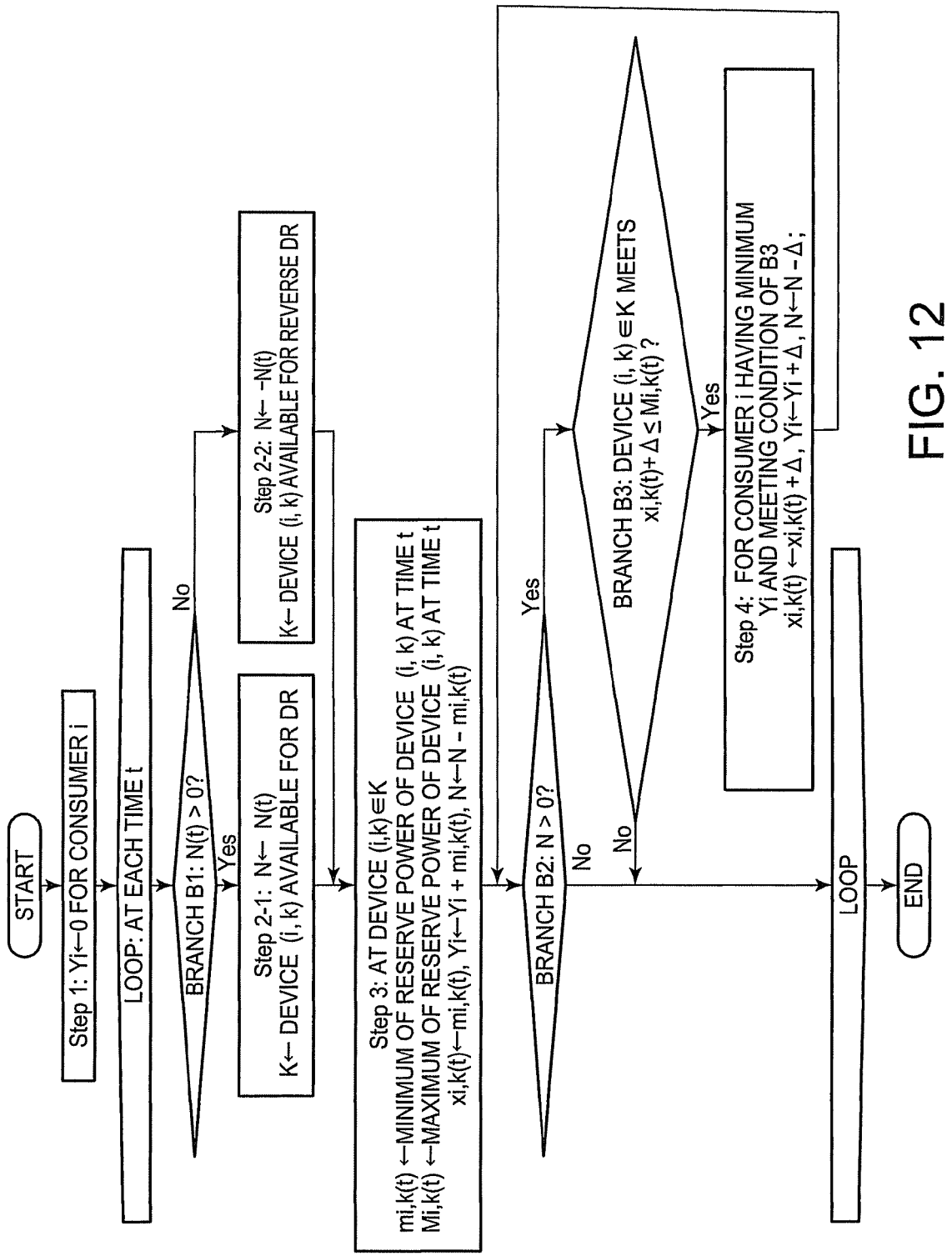
FIG. 12 is a flow chart showing an example of first solution for an optimization problem.

FIG. 12 is a flow chart showing an example of solution of the optimization problem.

At Step 1, a total value $Y_i$ of the DR amounts of the respective consumers is initialized and set to zero. The following processing is performed at every time t.

It is determined within a processing loop at each time t (Branch B1) whether or not the target value N(t) is positive. If the target value N(t) is positive, the processing goes to Step 2-1. If negative, the processing goes to Step 2-2.

Step 2-1 corresponds to excessively many demands. At Step 2-1, N (t), i.e. the target value, is substituted into N and a device (i, k) available for DR is added to a set K. On the other hand, Step 2-2 corresponds to excessively few demands. At Step 2-2, N (t) is substituted into N and a device (i, available for reverse DR is added to a set K. As a result, total power available for DR at the time t is stored in N and reserve power available at the time t is stored in the set K.

At Step 3, the minimum and the maximum of reserve power of the device (i, k) at the time t is substituted into $m_{i,k}$ (t) and $M_{i,k}$ (t), respectively. Subsequently, the processing adds the minimum of reserve power to the DR amount at each device (i, k). Specifically, $m_{i,k}$ (t) is substituted into the DR amount $x_{i,k}$ (t) of the device (i, k) at the time t and added to a total DR amount Yi at the consumer i. The total DR amount Yi is a total summed up to the time t. And, $m_{i,k}$ (t) is subtracted from the total power N to be provided for DR at the time t.

After Step 3, it is determined whether or not N>0 holds true (Branch B2). If N is positive, the processing goes to B3. If not, the processing is ended at the time t.

At Branch B3, it is determined whether or not a device (i, k) included in K meets $x_{i,k}(t)+\Delta \leq M_{i,k}$ (t). If the device (i, k) included in K meets $x_{i,k}(t)+\Delta \leq M_{i,k}$ (t), the processing goes to Step 4. If not, the processing is ended at the time t.

At Step 4, a device (i, k) provided to the consumer i having a minimum $Y_i$ is picked out of the devices (i, k) meeting the condition of Branch B3. The device (i, k) having the minimum $Y_i$ is processed so that the DR amount is increased by $\Delta$. Specifically, $\Delta$ is added to the DR amount $x_{i,k}$ (t) of the device (i, k) at the time t so that $\Delta$ is added to the total of the DR amount summed up to the time t at the consumer i. And, $\Delta$ is subtracted from the total power N to be provided for DR at the time t. Executing all the above-described, the processing goes back to branch B-2.

The loop including Branch B2, Branch B3, and Step 4 is repeated until a device k) meets N<0 at Branch B2 or a device k) does not meet $x_{i,k}$ (t)+$\Delta \leq M_{i,k}$ (t) at Branch B3. The processing at the time t ends when the device k) meets N<0 at Branches B2 or does not meet $x_{i,k}+\Delta \leq M_{i,k}$ (t) at B3.

In accordance with the above solution, Branch B-2 allows the processing to continue unless N<0 and thus allows the processing to provide a solution approaching the target value. Also at Step 4, a device is directed preferentially to DR. The device is provided to the consumer having minimized the total DR amount. Thus, the processing can provide a solution to minimize inequalities among consumers at Step 4.

There are considered various solutions for the above-formulated optimization problem. The solutions include optimization solver, simulated annealing, tabu search, and heuristics techniques such as genetic algorithm. The optimization solver provides an exactly optimized solution. The simulated annealing provides a locally optimized solution.

Example 1

Specific processing of the flow chart in FIG. 12 will be described below on the basis of an example shown in FIGS. 16A to 16D. In addition, each of two consumers are assumed be provided with one device 11, provided that k=1. That is, the consumer 1 and the consumer 2 are provided with the device (1, 1) and the device (2, 1), respectively. For simplicity, when devices 11 are during a transient period from the receiving of DR to the attainment of the RD amount, the consumers are assumed to have no reserve power for the devices 11.

The following are assumed in FIGS. 16A to 16D:
the present time $t_n$ is 11:00; and
150 (kW)-power shortage happens constantly for 60 min from 11:00 to 12:00. Also are assumed as follows:
the consumer 1 has reserve power for the device (1, 1) provided thereto;
the response time of the reserve power for the device (1, 1) is 1 min;
the maximum of the reserve power for the device (1, 1) is constantly 100 (kW);
the consumer 1 has reserve power for the device (2, 1) provided thereto;
the response time of the reserve power for the device (2, 1) is 16 min; and
the maximum of the reserve power for the device (2, 1) is constantly 200 (kW).

The step size $\Delta$ of the processing is assumed to 1 (kW).

At Step 1, totals Y1 and Y2 of DR amounts of the consumers 1 and 2 are initialized and set to zero. At Branch B1, N(t)=150 (kW) holds true at any time from 11:00 to 12:00. As a result, the processing goes to Step 2-1.

Operation at 11:00

Both the consumers 1 and 2 have no reserve power available for DR at 11:00. As a result, the set K becomes an empty set. Thus, Step 3 and Branch B3 have no appropriate device. As a result, the processing at 11:00 ends.

Operation from 11:01 to 11:15

The response time of the device (1, 1) is 1 min at 11:00, thereby leading to N=150 and K={device (1, 1)}.

In addition, two equations m1,1(11:01)=0 and M1,1(11:01)=100 hold true at Step 3. However, m1,1 (11:01)=0 changes none of x1,1 (t), Y1, and N.

At B2, N>0 allows the processing to go to Branch B3. At Branch B3, k=device (1, 1) allows the processing to go to Step 4.

The device (1, 1) is only an appropriate device at Step 4. Therefore, x1,1 (11:01)=1, Y1=1, and N=149 are acquired as a result of adding or subtracting $\Delta$ to or from the respective variables of the consumer 1 and the device (1, 1).

N=149 at Branch B2 allows the processing to go back to Branch B3. x1,1=1 and M1,1=100 hold true at Branch B3, thereby allowing the processing to go to Step 4. At Step 4, x1,1 (11:01)=2, Y1=2, and N=148 are acquired as a result of adding or subtracting $\Delta$ to or from the respective variables.

The above-described processing is repeated 100 times and ends at t=11:01, because the condition of B3 is not met at the time of yielding x1,1 (11:01)=100, Y1=100, and N=50.

However, only the reserve power of the device (1, 1) can be used from t=11:02 to t=11:15, thereby allowing the processing to end at the time of meeting x1,1 (t)=100.

Operation from 1116 to 11:25

The response times of the device (1, 1) and the device (2, 1) are 1 min and 16 min, respectively, thereby leading to N=150 and K={device (1, 1), device (2, 1)}.

m1,1 (11:16)=0, M1,1 (11:16)=100, m2,1 (11:16)=0, and M2,1 (11:16)=200 hold true at Step 3. In addition, mi,k (11:16)=0 changes none of xi,k (t), $Y_i$, and N at Step 3.

Next, N>0 at Branch B2 allows the processing to go to Branch B3. Both the device (1, 1) and the device (2, 1) meet the condition at Branch B3, thereby allowing the processing to further go to Step 4.

Although the device (1, 1) and the device (2, 1) are appropriate at Step 4, Y1=1500 and Y2=0 are provided as each total $Y_i$ of DR amount of a consumer i. Thus, x2,1 (11:16)=1, Y2=1, and N=149 are acquired as a result of adding or subtracting Δ to or from the respective variables of the consumer 2 and the device (2, 1).

N=149 at Branch B2 allows the processing to go back to Branch B3. x2,1=1 and M2,1=200 hold true at Branch B3, thereby allowing the processing to go to Step 4. Although the device (1, 1) and the device (2, 1) are appropriate at Step 4, Y1=1500 and Y2=1 are provided as each total $Y_i$ of DR amount of a consumer i. Therefore, x2,1 (11:16)=2, Y2=2, and N=148 are acquired as a result of adding or subtracting Δ to or from the respective variables of the consumer 2 and the device (2, 1).

The above-described processing is repeated 150 times and ends at t=11:16, because the condition of B2 is not met at the time of holding x2,1 (11:16)=150, Y2=150, and N=0. However, only the reserve power of the device (1, 1) can be used from t=11:17 to t=11:25, thereby allowing the processing to end at the time of meeting x2,1 (t)=150.

Operation at and After 11:26

At Step 2-1, N=150 and K={device (1, 1)} hold true at t=11:26 in the same way as until 11:25. At Step 3, m1,1 (11:26)=0, M1,1 (11:26)=100, m2,1 (11:26)=0, and M2,1 (11:26)=200 hold true in the same way as until 11:25.

At Branch B2, N>0 allows the processing to go to Branch B3. At Step 4, both the device (1, 1) and the device (2, 1) meet the condition of Step 4, thereby allowing the processing to go to Step 4.

Although the device (1, 1) and the device (2, 1) are appropriate at Step 4, Y1=1500 and Y2=1500 are provided as each total $Y_i$ of DR amount of a consumer i. Therefore, x1,1 (11:26)=1, Y1=1501, and N=149 are acquired as a result of adding or subtracting Δ to or from the respective variables of the consumer 1 and the device (1, 1) when a consumer denoted by a smaller numeral is prioritized.

At B2, N=149 allows the processing to go to Branch B3. At Branch B3, x2,1=1, M2,1=200 allow the processing to further go to Step 4. Although the device (1, 1) and the device (2, 1) are appropriate at Step 4, Y1=1501 and Y2=1500 are provided as each total $Y_i$ of DR amount of a consumer i. Therefore, x2,1(11:26)=1, Y1=1501, and N=148 are acquired as a result of adding or subtracting Δ to or from the respective variables of the consumer 2 and the device (2, 1).

The above-described processing is repeated 75 times and ends at t=11:26, because the condition of B2 is not met at the time of yielding x1,1 (11:01)=100, Y1=100, and N=50. In addition, the processing ends at the time of yielding x1,1 (t)=75 and x2,1 (t)=75 also at and after t=1127.

Figure 16A:
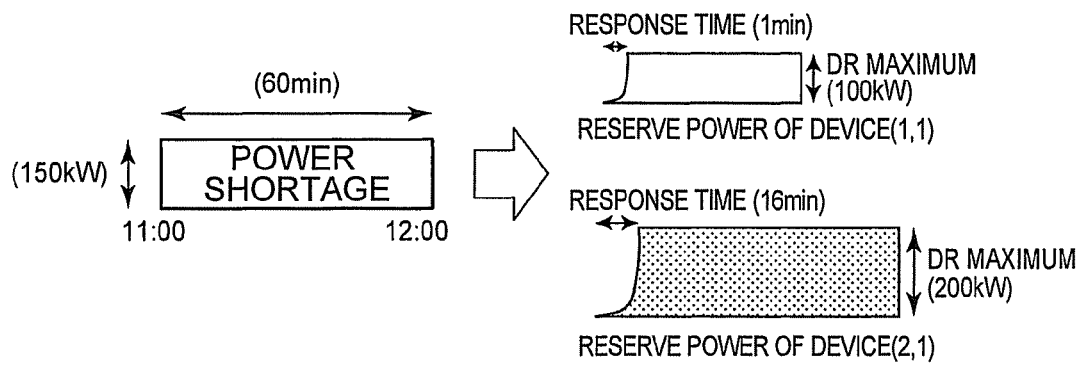
FIGS. 16A to 16D are views showing specific processing of the first solution.
Figure 16B:
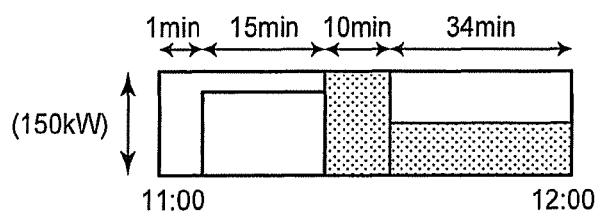

The above-described steps yield a DR program to provide the following processing as shown in FIG. 16B:

the reserve power for the device (1, 1) is used from 11:01 to 11:16;
the reserve power for the device (2, 1) is used from 11:17 to 11:26; and
the reserve power for the device (1, 1) and the device (2, 1) is equally used at and after 11:27.

Second Example of Solution

A solution will be described below as a second example when reserve power practically costs each consumer and differs from one consumer to another. In a second example of solution, it is possible to solve the optimization problem with a flow chart shown in FIG. 13.

When the second example of solution is compared with the flow chart of the first example shown in FIG. 12, the second example of solution is different from the first example in that $Y_i$ is not a total DR amount of a consumer i but includes a weight coefficient for cost summation given by the following equation.

$$Y_i = \Sigma_t c_i(t) \cdot X_i(t) \quad \text{[Formula 7]}$$

Here, $c_i(t)$ is a cost of a consumer i per 1 (kW) of DR amount at the time t. When updating $Y_i$ at Step 3 and Step 4, the second example multiplies a newly added term by a weighting coefficient $c_i(t)$. The second example differs from the first example shown in FIG. 12 in the multiplication of the weighting coefficient $c_i(t)$.

Alternatively, $c_i(t)$ may be constant or vary in a step-wise manner. For example, $c_i(t)$ is set to 1.0 when the DR amount is less than 100 (kW) and $c_i(t)$ is set to 2.0 when the DR amount is not less than 100 (kW) and not more than 200 (kW).

The cost $c_i(t)$ may be considered as an index of discomfort that a consumer feels by receiving DR. Thus, when changing $c_i(t)$ in terms of time, a DR amount need not be a variable. Alternatively, time and environment, etc. may be set as the variable, for example.

Example 2

Figure 13:
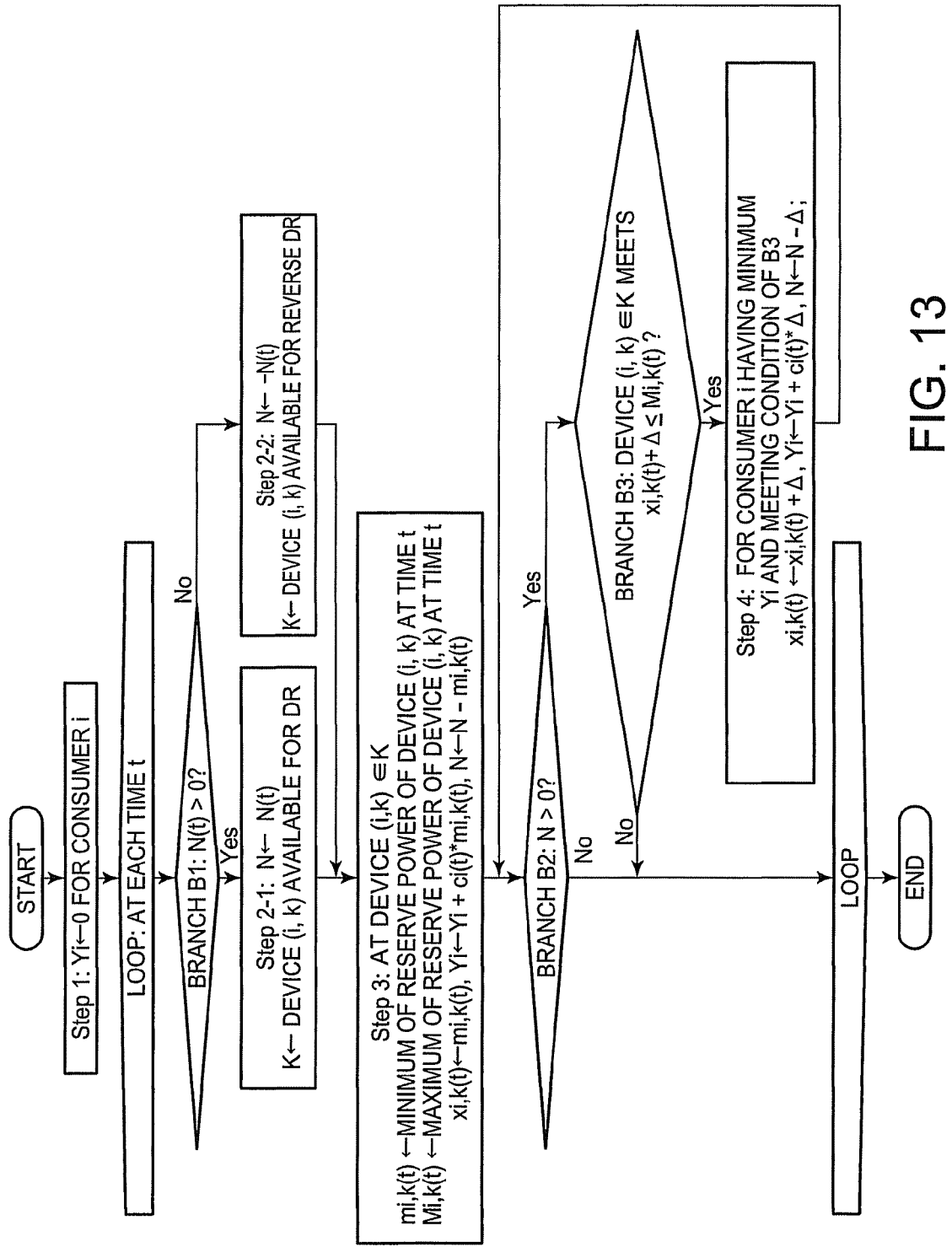
FIG. 13 is a flow chart showing an example of second solution for the optimization problem.

Specific processing of the flow chart in FIG. 13 will be described on the basis of the difference from the processing of the example 1. In addition, the costs of the consumer 1 and the consumer 2 are assumed to be constantly 1.5 and 1.0 per 1 (kW) of reserve power, respectively.

The processing from t=11:00 to t=11:25 in the example 2 is the same as that in the example 1 except that Y1 obtained is one and half times. Accordingly, DR is not executed at t=11:00. DR of 100 (kW) is executed only for the device (1, 1) from t=11:01 to t=11:15. DR of 150 (kW) is executed only for the device (2, 1) from t=1116 to t=1125.

Y1=100*15*1.5=2250 and Y2=150*10*1.0=1500 are yielded at t=11:26. That is, Y1 is larger than Y2, thereby allowing the processing to execute DR of 150 (kW) only for the device (2, 1) provided to the consumer 2 up to the time of t=1131 at which Y1 is equal to Y2.

On the other hand, Y1 and Y2 are newly needed to be equal to each other as weight coefficients at and after t=11:32, thereby yielding x1,1 (t)=60 (kW) and x2,1 (t)=90 (kW) instead of yielding x1,1 (t)=x2,1 (t)=90 (kW).

Figure 16C:
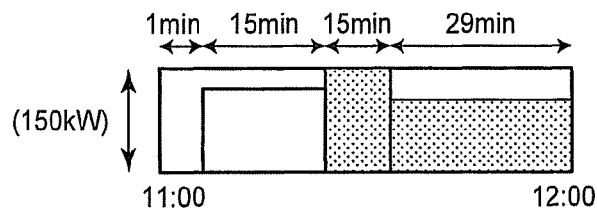
Figure 16D:
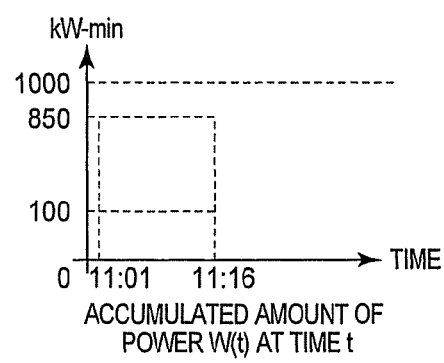

Summarizing the above results yields FIG. 16C. As shown in FIG. 16C, a DR program is created to include the following steps: the reserve power for the device (1, 1) is consumed from 11:01 to 11:16; the reserve power for the device (2, 1) is consumed from 11:17 to 11:31; and At and after 11:32, the reserve power for the device (1, 1) and the reserve power for the device (2, 1) are consumed so that a ratio of the former reserve power to the latter reserve power is 2:3.

Alternatively, each device may be assumed to have a cost $c_{i,k}(t)$, although each consumer has been assumed to have the cost $c_{i,k}(t)$. Each device having the cost $c_{i,k}(t)$ provides the following formula as Y.

$$Y_i = \Sigma_t \Sigma_k c_{ik}(t) \cdot x_{ik}(t) \quad \text{[Formula 8]}$$

First Modification 1

Figure 14:
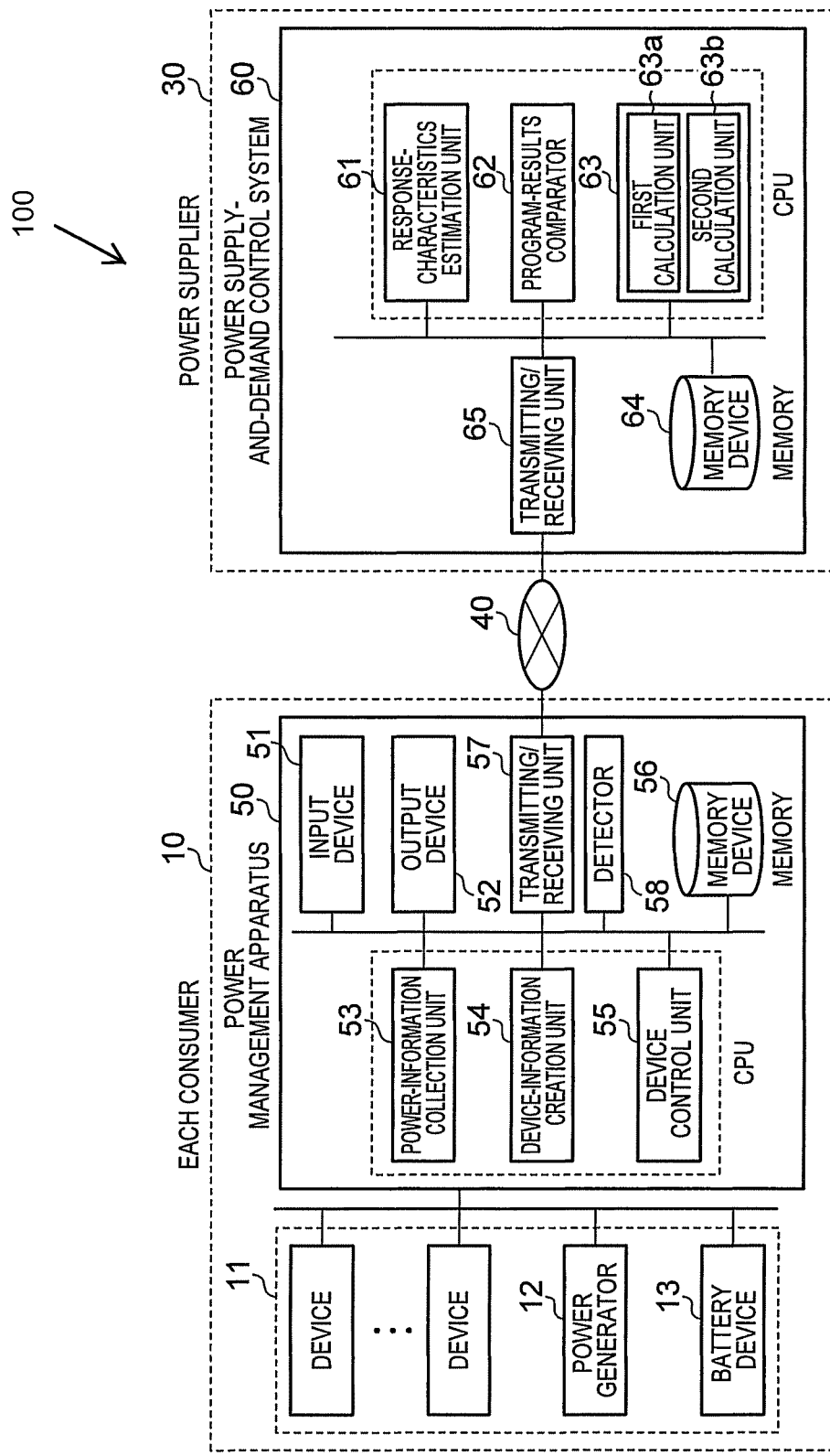
FIG. 14 is a configuration view showing a first modification of the power control system in accordance with the first embodiment.

FIG. 14 is a configuration view showing a first modification of the power control system 100 in accordance with the first embodiment.

The configuration view includes a battery system 13 as one of the devices 11. The battery system accumulates power which is supplied by a supplier 30 or generated by the power generator 12. All or some consumers are provided with the battery system 13. Examples of the battery system 13 can include devices provided with a secondary battery, e.g., an electric vehicle.

In electric vehicles, the battery system 13 is considered to discharge for DR and charge for reverse DR. In addition, the DR signal specifies power (kW) to be charged and discharged by the battery system 13 at each time as a DR amount on the zero-basis.

Here, the battery system 13 is assumed to have M1 (kW), M2 (kW), C (kW×min), and W0 (kW×min) as a DR maximum, a DR minimum, a capacity, and a stored amount of power, respectively. In addition, the response speeds for DR and reverse DR are v1 (kW/min) and v2 (kW/min), respectively.

A limitation equation of $x_{i,k}$ (t) is given in the same way as in the devices 11 available for DR and reverse DR as follows.

$$\text{MAX}(M2, x_{i,k}(t-1)-v2) \leq x_{i,k}(t) \leq \text{MIN}(M1, x_{i,k}(t-1)+v1) \quad \text{[Formula 9]}$$

The total of a stored amount of power W0 at t=0 and a total DR amount up to a time t is a stored amount of power at the time t. The stored amount of power at the time t must be in the range of less than 0 and not more than the capacity C, thereby giving the following limitation equation.

$$0 \leq W_0 - \Sigma_t x_{i,k}(t) \leq C \quad \text{[Formula 10]}$$

Thus, a formula combining the above two formulae to each other is considered to correspond to Formula (3) in the optimization problem.

Third Example of Solution

A third example of solution will be given below to describe a solution assuming that the battery system 13 is included. The third example of solution can use the flow chart shown in FIG. 15.

Figure 15:
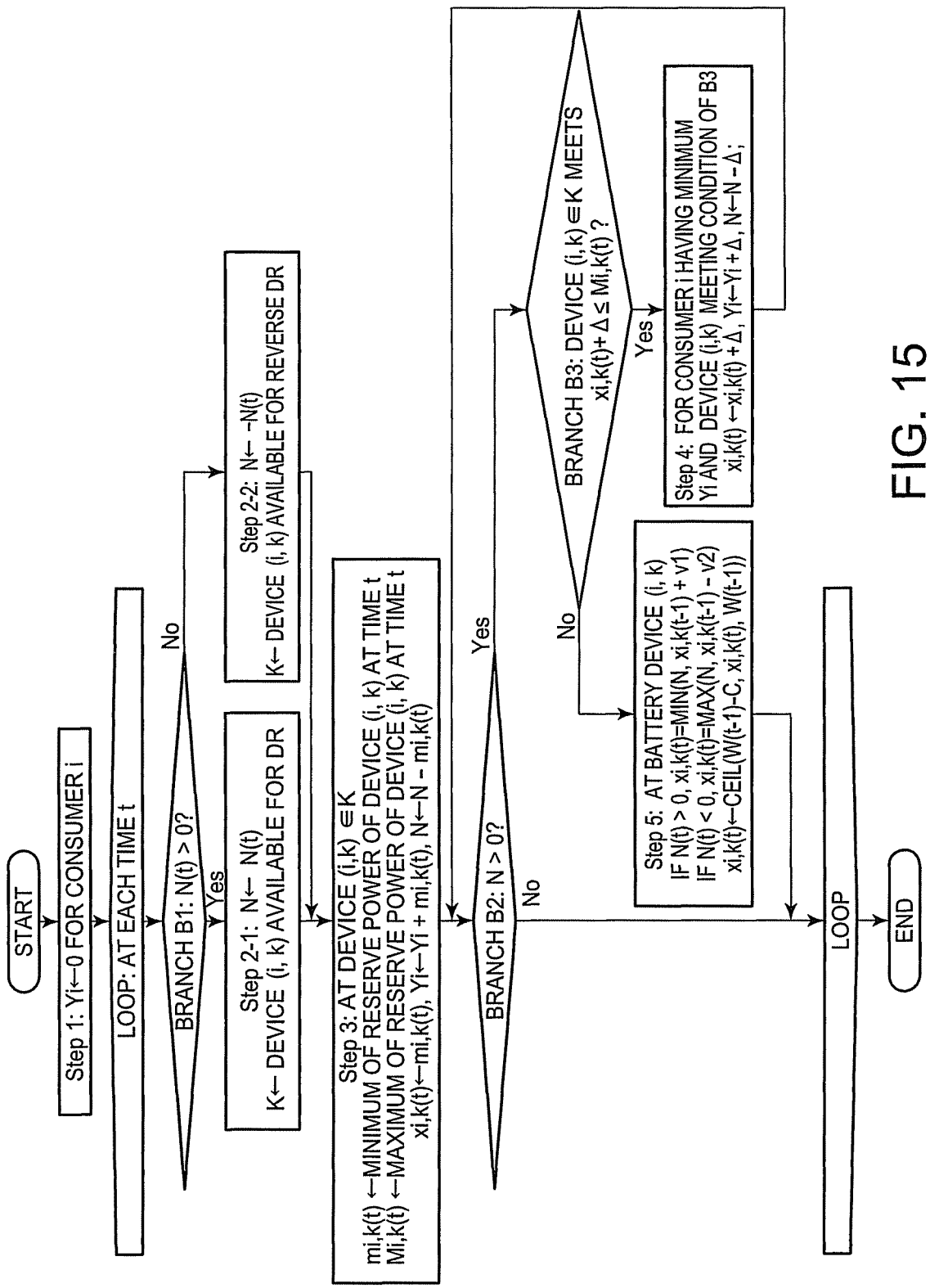
FIG. 15 is a flow chart showing an example of third solution for the optimization problem.

The flow chart of FIG. 15 in this example is different from that of FIG. 12 in that Step 5 is newly added to follow "No" of Branch B3. At Step 5, a DR amount $x_{i,k}$ (t) required of the battery system 13 is calculated in order to compensate for a portion of the target value. The portion cannot be covered by reserve power supplied by any devices other than the battery system 13.

Specifically, excessive demand (N(t)>0) yields $x_{i,k}$ (t)=MIN (N(t), $x_{i,k}$ (t−1)+v1) and excessive supply (N(t)<0) yields $x_{i,k}$ (t)=MAX (N(t), $x_{i,k}$ (t−1)−v2). When a restriction on the stored amount of power W (t) is considered, the processing yields CEIL (W (t−1)−C, $x_{i,k}$ (t), W (t−1)) as the DR amount $x_{i,k}$ (t). Here, CEIL (a, x, b) yields x if x is not less than a and not more than b. CEIL (a, x, b) yields a and b if x is a or less and if x is b or more, respectively.

Alternatively, the solution may insert Step 5 immediately before Branch B2, thereby enabling it to firstly control so that the target value is approached by the reserve power of the battery system 13. The reserve power of devices 11 other than the battery system 13 may secondly compensate for the rest of the target value which has not been covered by the reserve power of the battery system 13.

When two or more battery systems 13 are included, a limitation can be added to create priorities of the battery systems 13.

Example 3

Here, specific processing based on the flow chart of FIG. 15 will be described with a focus on the difference from the processing in an example 1. An example 3 employs the following assumption. Just one battery system is included, which has a capacity of 1000 (kW×min) and is charged up to 1000 (kW×min) at 11:00. The response speed of the battery system is assumed to be sufficiently high.

In the example 3, the processing at any time is the same as that in the example 1 except for Step 5.

At Step 5, the rest except for N=0 is to be covered by the discharge from the battery system. Therefore, 150 (kW) is discharged at 11:00 and then 50 (kW) is discharged from 11:01 to 11:15. As a result, a total of 1*150+15*50=900 (kW×min) is to be discharged as shown in the time history of the accumulated amount of power of FIG. 16D.

In accordance with the example 3, the battery system 13 can compensate for a lack of power which cannot be covered by reserve power of the devices 11. Therefore, the example 3 enables it to create a DR program allowing short or excessive power to approach the target value more precisely.

Second Modification 2

Figure 17:
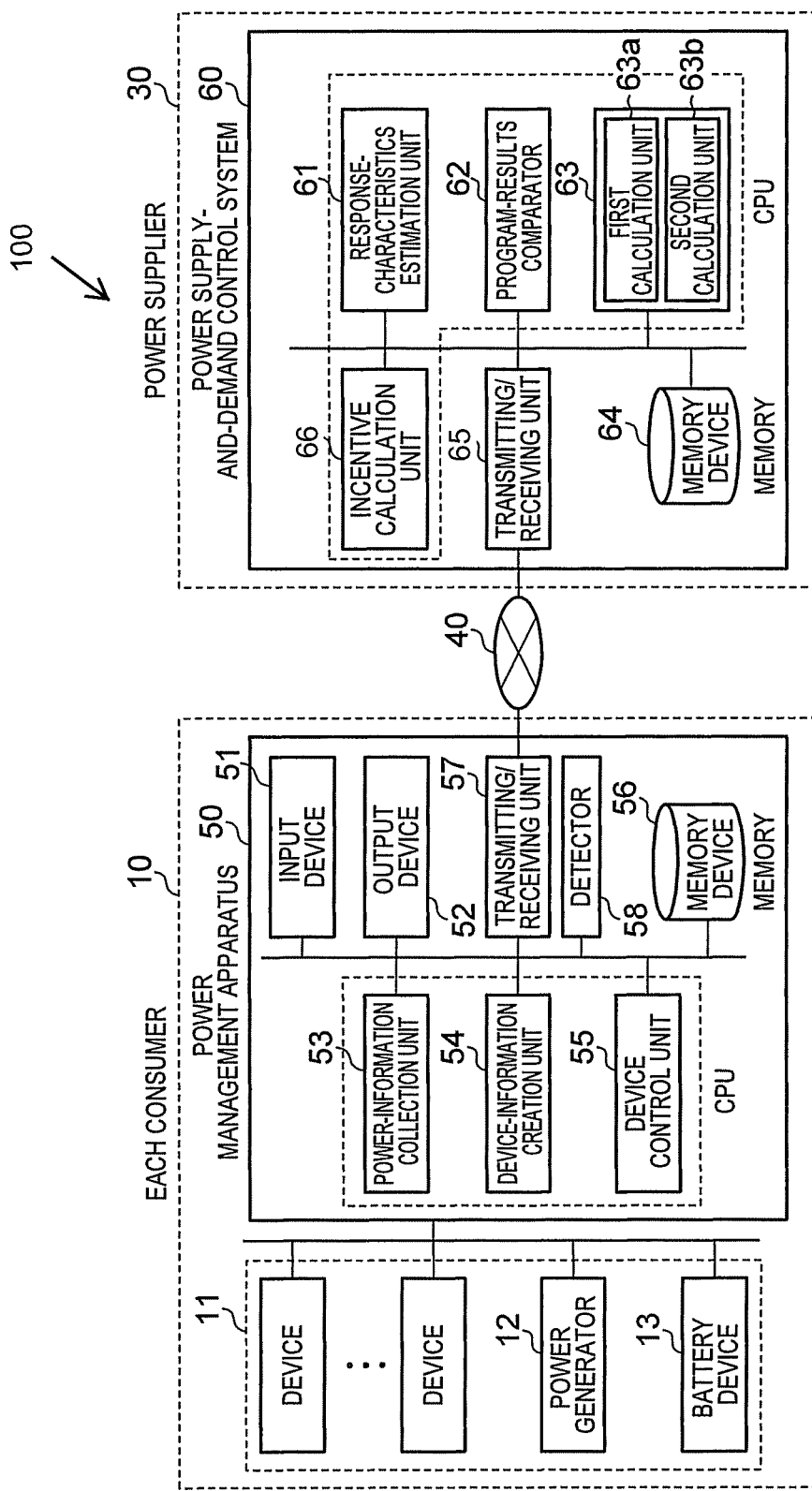
FIG. 17 is a configuration view showing a second modification of the power control system in accordance with the first embodiment.

FIG. 17 is a configuration view showing a second modification of the power control system 100 in accordance with the first embodiment. A power supply-and-demand control system 60 of the power control system 100 in accordance with the third modification is provided with an incentive calculation unit 66 in addition to the configuration of FIG. 2. Wherever possible, the same reference numerals or marks will be used to denote the same or like portions throughout the figures in the same configuration of the third modification as the first embodiment. The same description will not be repeated.

The incentive calculation unit 66 calculates power urgency and incentive. The power urgency indicates a degree of gap between power supply and power demand. The incentive is returned to a consumer on the basis of how the consumer responded to a requirement of power supply or power demand.

Figures 18, 19:
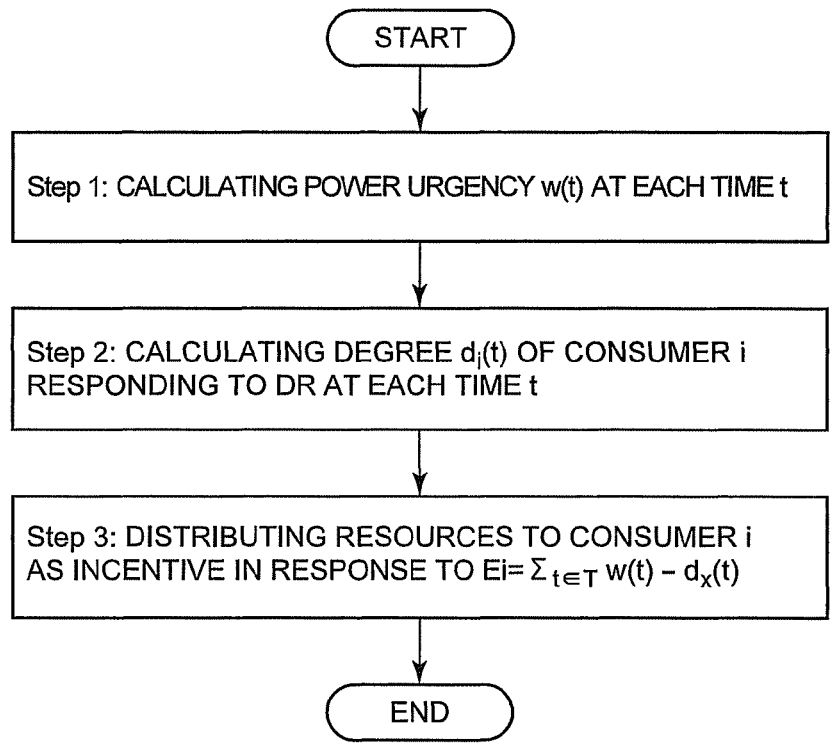
FIG. 18 is a flow chart describing operation of an incentive calculation unit.
FIG. 19 is a view showing an example of calculating incentives.

FIG. 18 is a flow chart describing operation of the incentive calculation unit 66.

At Step 1, the power urgency is calculated at each time. Specifically, the power urgency is calculated using the supply-and-demand unbalance F (t) at a time t as follows.

$$w(t) = |F(t)| \quad \text{[Formula 11]}$$

At Step 2, a degree $d_i$ (t) of a consumer i responding to DR during a prescribed term is calculated using a total amount $S_i$ (t) of DR and a total $R_i$ (t) of the resultant amount coordinated for the DR. The total amount $S_i$ (t) of DR has been required of the device provided to the consumer i. The total $R_i$ (t) is referred to as the "results."

$$d_i(t) = 1/|R_i(t) - S_i(t)| \quad \text{[Formula 12]}$$

At Step 3, the incentive is assigned to each consumer in response to $E_i$ given by the following formula. In addition, $d_i$(t) takes a maximum of 1.0 and $d_i$ (t)=1.0 is assumed whenever the dominator in the right side of Formula 12 is less than 1.0.

$$E_i = \Sigma_t w(t) \cdot d_i(t) \quad \text{[Formula 13]}$$

A total amount r of resources is prorated in response to $E_i$ and the incentive is assigned to each consumer i in steps of $I_i$. A power supplier, etc. prepares the resources beforehand to assign the incentive to each consumer i.

$$I_i = r \cdot E_i / \Sigma_i E_i \quad \text{[Formula 14]}$$

The above calculation of the incentive is an example. Alternatively, the incentive calculation unit may employ any unit which is capable of calculating incentive on the basis of a degree and a difference between a target value and a result value. The degree indicates how a consumer responded to a requirement of power supply or power demand. Alternatively, the function of the incentive calculation unit 66 may be called in real time or periodically, e.g., every two days.

Example 4

Here, specific processing based on the flow chart of FIG. 18 will be described with reference to FIG. 19 as an example.

In the example shown in FIG. 19, the following are assumed:

the urgency of power demand is higher from 12:00 to 13:00 than from 11:00 to 12:00;

the target value of the consumer 1 is set to 200 (kWh) from 12:00 to 13:00 and 150 (kWh) from 12:00 to 13:00; and the target value of the consumer 2 is set to 400 (kWh) from 12:00 to 13:00 and 300 (kWh) from 12:00 to 13:00.

Also are assumed:

the result value of the consumer 1 is 250 (kWh) from 12:00 to 13:00 and 200 (kWh) from 12:00 to 13:00; and the result value of the consumer 2 is 500 (kWh) from 12:00 to 13:00 and 600 (kWh) from 12:00 to 13:00.

In other words, it is exemplified that the consumer 1 can follow the target value more than the consumer 2.

In this case, the urgency of power demand is assumed to be calculated on the basis of the flow chart in FIG. 18 as being 1.0 from 11:00 to 12:00 and 3.0 from 12:00 to 13:00.

The degree of response to DR is calculated at Step 2. For example, the degree of response of the consumer 1 is calculated to be 0.2 from 1/(250−200). In the same way, the degree of the consumer 1 is calculated to be 0.02 from 12:00 to 13:00. The degree of the consumer 2 is calculated to be 0.02 from 11:00 to 12:00 and 0.0033 from 12:00 to 13:00.

Finally, $E_i$ is calculated at Step 3. Specifically, $E_i$ is calculated as $1.0*0.02+3.0*0.02=0.08$ and $1.0*0.01+3.0*0.0033=0.02$ for the consumers 1 and 2, respectively.

As a result, if the resources are valued at $1,000, $800 and $200 are proportionally distributed as the incentive to the consumers 1 and 2, respectively, in accordance with the respective values of $E_i$.

Second Embodiment

Figure 20:
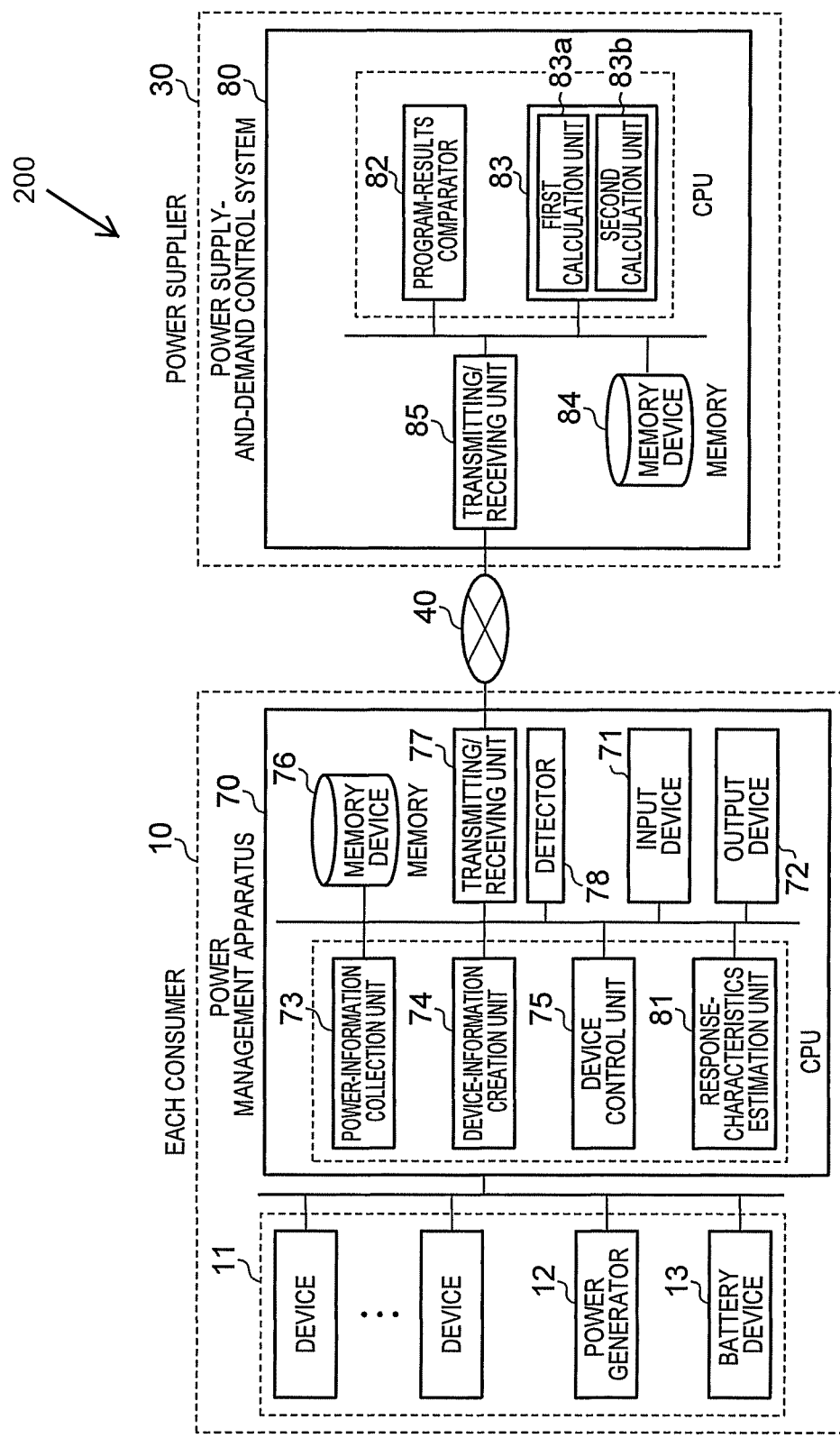
FIG. 20 is a view showing a configuration of a power control system in accordance with a second embodiment.

FIG. 20 is a view showing a configuration of a power control system 200 in accordance with a second embodiment.

The power control system 200 is different from the power control system 100 shown in FIG. 2 in that a power management apparatus 70 provided to the consumer 10 is provided with a response-characteristics estimation unit 81.

In the second embodiment, the response-characteristics estimation unit 81 uses response results of the devices 11 to calculate a response speed and a response time periodically. Furthermore, the response-characteristics estimation unit 81 updates the response speed and the response time both being included in device information. The device information is created by a device-information creating unit 74.

At that time, the memory unit 56 stores DR signals previously received by the memory unit 56 as a database to compare information of the database with response results, thereby providing the response results.

The response-characteristics estimation unit 81 transmits the thus-updated device information to a power supply-and-demand control apparatus 80 provided to the power supplier 30 via the network 40.

Other configurations of the power control system 200 are the same as those of power control system 100 in accordance with the first embodiment.

As described above, the power supply-and-demand control apparatus or the power management apparatus both being employed in the power control system enables it to robustly control the power supply-and-demand balance. The power supply-and-demand control apparatus or the power management apparatus responds to temporal variations of the power supply-and-demand amount when the response speed of available reserve power is taken into consideration.

Alternatively, the devices 11 may be electrically-powered apparatuses including an elevator, an escalator, equipment in factory lines, and medical equipment in a hospital.

The DR amount has been specified as "electric power", measured by kW basis throughout the specification. Alternatively, the RD amount may be specified as "electric energy", measured by kWh or J basis. In the same way, the results of power demand or the devices may be also specified as "electric energy."

While certain embodiments of the invention have been described, these embodiments have been presented by way of example only, and are not intended to limit the scope of the inventions. Indeed, the novel elements and apparatuses described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An electric power supply-and-demand control system capable of transmitting/receiving data to/from a power management apparatus provided to each of consumers to instruct the power management apparatus to adjust electric power, the system comprising:
   a memory unit to memorize a supply, consumptions, reserve power, and response results, the supply showing a total of electric power supplied to the consumers, the consumptions showing electric-power consumptions of the consumers, the reserve power showing a range of electric power adjustable for each of the consumers, the response results showing a time needed for the consumers to have reached a first adjustment amount previously,
   an estimation unit to estimate a response speed on the basis of the response results;
   a first calculation unit to calculate a target value allowing it to eliminate an unbalance between the supply and a demand, the demand being given as a total of the consumptions; and
   a second calculation unit to calculate second adjustment amounts so that a total of the second adjustment amounts approaches the target value and is in the range.

2. The system according to claim 1, further comprising a transmitter to transmit the second adjustment amount to the power management apparatus.

3. The system according to claim 1, wherein
   one or more devices are provided to each of the consumers; and
   the memory unit memorizes the reserve power involved in operation of each of the devices; and
   the second calculation unit calculates the second adjustment amount to be assigned to the devices.

4. The system according to claim 1, wherein the first adjustment amount and the second adjustment amount include amounts for adjustments of power consumption, generated power, charged power and discharged power.

5. The system according to claim 1, further comprising an incentive calculation unit to calculate an incentive distributed to each of the consumers on the basis of a gap between the first adjustment amount and an amount of electric power, the amount of electric power being actually adjusted by each of the consumers.

6. An electric power supply-and-demand control method for an electric power supply-and-demand control system of claim 1,
the method comprising:
estimating response characteristics including a response speed on the basis of the response results by the use of the estimation unit;
calculating a target value by the use of the first calculation unit, the target value allowing it to eliminate an unbalance between the power supply and a power demand, the power demand being given as a total of power consumptions; and
calculating the second adjustment amounts by the use of the second calculation unit so that a total of the second adjustment amounts approaches the target value and is in the range.

7. An electric power supply-and-demand control system capable of transmitting/receiving data to/from a power management apparatus provided to each of consumers, the system comprising:
a memory unit to memorize a supply, consumptions, reserve power, and response characteristics, the supply showing a total of electric power supplied to the consumers, the consumptions showing electric power consumptions of the consumers, the reserve power showing a range of electric power adjustable for each of the consumers, the response characteristics including a response speed,
a first calculation unit to calculate a target value allowing it to eliminate an unbalance between the supply and a demand, the demand being given as a total of the consumptions;
a second calculation unit to calculate adjustment amounts of electric power so that a total of the adjustment amounts approaches the target value and is in the range; and
a transmitter to transmit the total to the power management apparatus.

8. A power management apparatus capable of transmitting/receiving data to to/from an electric power supply-and-demand control system, the apparatus comprising:
devices provided to each of consumers;
a memory unit to memorize reserve power for operation of each of the devices;
a detector to detect power consumptions by the consumers; and
a transmitter to transmit the power consumptions and the reserve power to the electric power supply-and-demand control system.

9. The apparatus according to claim 8, further comprising a controller to memorize a power adjustment and control operation of the devices so that electric power approaches the power adjustment.

10. A power management apparatus capable of transmitting/receiving data to/from an electric power supply-and-demand control system and being instructed to adjust electric power by the system, the apparatus comprising:
devices are provided to each of consumers;
a memory unit to memorize a first adjustment amount of electric power, reserve power, response results, the reserve power showing a range of electric power adjustable for each of the consumers to operate the devices, the response results including a time needed for the consumers to have reached a second adjustment amount of electric power previously;
a detector to detect power consumption of each of the consumers;
an estimation unit to estimate response characteristics including a response speed on the basis of the response results;
a controller to control the devices so that the power consumption approaches the first adjustment amount; and
a transmitter to transmit the power consumption and the response characteristics to the system.

* * * * *